United States Patent [19]

Evans

[11] Patent Number: 5,689,596
[45] Date of Patent: Nov. 18, 1997

[54] NONLINEAR OPTICAL LOOP MIRROR DEVICE PROVIDING PULSE WIDTH SWITCHING

[75] Inventor: Alan F. Evans, Beaver Dams, N.Y.

[73] Assignee: Corning, Inc., Corning, N.Y.

[21] Appl. No.: 799,345

[22] Filed: Feb. 13, 1997

Related U.S. Application Data

[62] Division of Ser. No. 577,135, Dec. 22, 1995, abandoned.

[51] Int. Cl.$^6$ ............................. G02B 6/26; G02B 6/42
[52] U.S. Cl. ............................. 385/27; 372/6; 359/337
[58] Field of Search ..................... 385/15, 16, 31, 385/27, 37, 39, 122, 124; 372/6, 18, 94; 359/337, 110, 177, 341, 174, 333

[56] References Cited

U.S. PATENT DOCUMENTS

| | | | |
|---|---|---|---|
| 3,756,688 | 9/1973 | Hudson et al. | 385/39 |
| 4,205,901 | 6/1980 | Ramsay et al. | 385/124 |
| 4,708,421 | 11/1987 | Desurvire et al. | 385/30 |
| 4,723,828 | 2/1988 | Garel-Jones et al. | 385/29 |
| 4,881,788 | 11/1989 | Doran | 385/27 |
| 4,962,987 | 10/1990 | Doran | 385/122 |
| 4,973,122 | 11/1990 | Cotter et al. | 385/50 |
| 5,037,172 | 8/1991 | Hekman et al. | 385/31 |
| 5,050,183 | 9/1991 | Duling, III | 372/94 |
| 5,058,986 | 10/1991 | Nayar et al. | 385/27 |
| 5,138,686 | 8/1992 | Chikuma et al. | 385/122 |
| 5,142,596 | 8/1992 | Mizuuchi et al. | 385/122 |
| 5,144,375 | 9/1992 | Gabriel et al. | 385/16 |
| 5,146,517 | 9/1992 | Avramopoulos et al. | 385/39 |
| 5,189,722 | 2/1993 | Chikuma | 385/122 |
| 5,195,160 | 3/1993 | Byron | 385/124 |
| 5,208,455 | 5/1993 | Nelson et al. | 250/227.19 |
| 5,214,736 | 5/1993 | Uemiya et al. | 372/6 |
| 5,241,616 | 8/1993 | Garcia | 385/126 |
| 5,301,008 | 4/1994 | Huang et al. | 385/16 |
| 5,307,428 | 4/1994 | Blow et al. | 385/11 |
| 5,333,220 | 7/1994 | Nelson et al. | 385/48 |
| 5,359,612 | 10/1994 | Dennis et al. | 372/6 |
| 5,363,386 | 11/1994 | Smith | 372/6 |
| 5,365,531 | 11/1994 | Lin et al. | 372/18 |
| 5,406,214 | 4/1995 | Boda et al. | 324/765 |
| 5,418,882 | 5/1995 | Ortiz, Jr. | 385/124 |
| 5,420,684 | 5/1995 | Carroll | 372/94 |
| 5,481,390 | 1/1996 | Naito | 385/15 |
| 5,574,534 | 11/1996 | Nogiwa et al. | 359/337 |

FOREIGN PATENT DOCUMENTS

| | | |
|---|---|---|
| 262708 | 11/1986 | Japan . |
| 4371904 | 12/1992 | Japan . |
| 5107581 | 4/1993 | Japan . |
| 5100258 | 4/1993 | Japan . |
| 5224249 | 9/1993 | Japan . |

OTHER PUBLICATIONS

Vladimir A. Bogatyrev et al., A. Single-Mode Fiber with Chromatic etc., May 1991, pp. 561-566.
Kazuhito Tajima, Compensation of soliton broadening etc., Jan. 1987, pp. 54-56.
Andrew J. Stentz et al., Dramatically improved transmission etc., Sep. 1995, pp.1770-1772.
M.E. Fermann et al., Nonlinear amplifying loop mirror, Jul. 1990, pp. 752-754.
N.J. Doran et al., Nonlinear-optical loop mirror, Jan. 1988, pp. 56-58.
J.D. Moores et al., Optical switching using fiber ring reflectors, Mar. 1991, pp. 594-601.

*Primary Examiner*—Akm E. Ullah
*Attorney, Agent, or Firm*—Harris Beach & Wilcox, LLP

[57] ABSTRACT

A nonlinear optical loop mirror device having a distributed directional asymmetry. A dispersion decreasing optical fiber is formed into a loop by an optical coupler which divides input pulses into two component pulses that propagate around the loop in opposite directions, and which transmits and/or reflects returning component pulses in accordance with their relative phases. The parameters of the loop, such as its length, effective area, rate of change of dispersion, etc. are selected so that input pulses may be switched or transmitted in accordance with whether their widths or amplitudes are above or below predetermined threshold values.

27 Claims, 6 Drawing Sheets

$$(1)\ D(Z) = \frac{D_{MAX} e^{-RZ}}{1+KZ}$$

WHERE: $R$ = EXP. RATE OF CHANGE OF DISPERSION
$Z$ = DISTANCE ALONG FIBER ($0 \leq Z \leq L$)
$K$ = A CONSTANT
$D_{MAX}$ = DISPERSION (GVD) AT HIGH DISPERSION END OF FIBER $$(2)\ N^2 = \frac{K_1 G P_0 T_0^2}{D} = K_2 G P_0 Z_0$$

WHERE: $N$ = SOLITON ORDER NUMBER
$P_0$ = PEAK POWER = AMPLITUDE
$T_0$ = TEMPORAL PULSE WIDTH
$Z_0$ = SOLITON PERIOD
$K_1, K_2$ = CONSTANTS OF PROPORTIONALITY
$G = \frac{N_2}{A_{EFF.}} = \frac{\text{NONLINEAR KERR COEFFICIENT}}{\text{EFFECTIVE AREA OF FIBER}}$

FIG.3

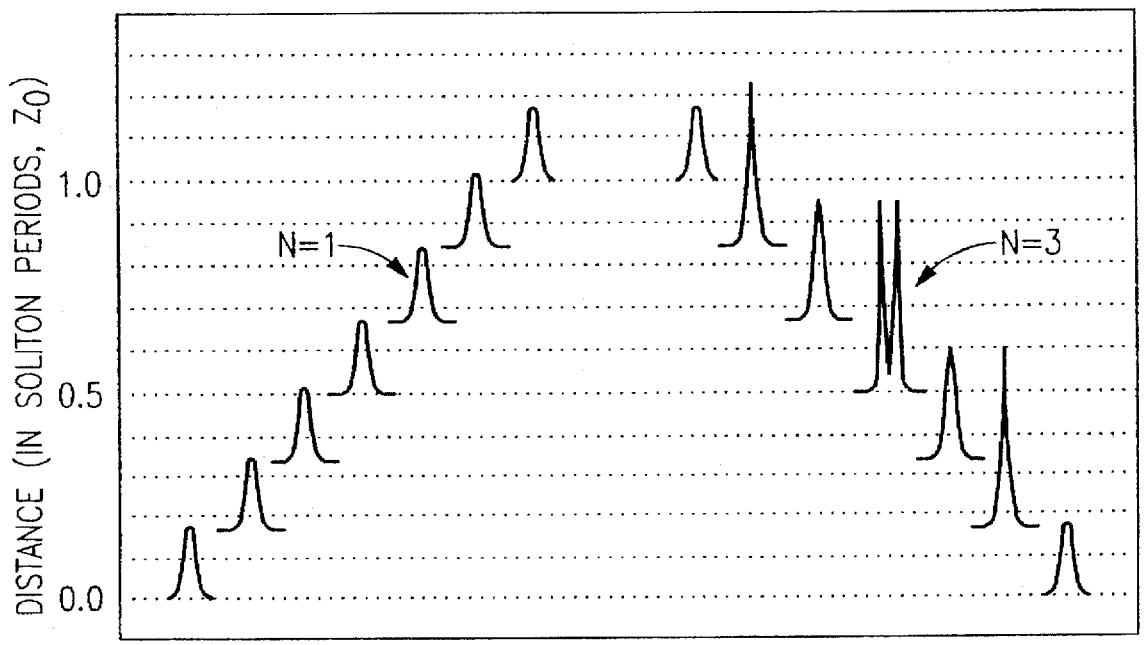

FIG.4

NONLINEAR OPTICAL LOOP MIRROR DEVICE PROVIDING PULSE WIDTH SWITCHING

This application is a divisional of application Ser. No. 08/577,135 filed on Dec. 22, 1995, now allowed.

BACKGROUND OF THE INVENTION

The present invention relates to nonlinear optical loop mirror devices, and is directed more particularly to nonlinear optical loop mirror devices which include optical fibers having dispersions which decrease monotonically along the length thereof.

Nonlinear optical loop mirrors (NOLMs) and related nonlinear amplifying loop mirrors (NALMs) have developed into important building blocks which are widely used in the switching, shaping and other processing of optical pulses. In such loop mirrors, optical pulses are coupled into a loop of optical fiber through a coupler that divides them into two component pulses which propagate around the loop in opposite directions, and which are transmitted and/or reflected by the loop mirror, depending upon the phases with which the component pulses return to the coupler. A NOLM of this general type is described in "Nonlinear Optical Loop Mirror", by N. Doran and D. Wood, Optical Letters, Vol. 13, No. 1, pp. 56–58, January 1988. A NALM of this general type is described in "Nonlinear Optical Loop Mirror", by M. Fermann, et al., Optics Letters, Vol. 15, No. 13, pp. 752–754, July 1990.

If a coupler divides an input pulse into two equal component pulses, and if the loop affects these component pulses in the same way, i.e., symmetrically, the component pulses will interfere constructively on their return to the coupler and, consequently, will be reflected back through the coupler port through which they entered. If the pulses are divided into unequal component pulses, and/or if the loop affects the component pulses differently, i.e., unsymmetrically or asymmetrically, the pulses may interfere either constructively, destructively or partly constructively and partly destructively. In such cases the pulses returning to the coupler may be reflected, transmitted or partly reflected and partly transmitted. This directional routing property of asymmetric NOLMs provides great opportunities for signal processing which are not provided by symmetrical NOLMs.

Asymmetrical NOLMs differ from one another primarily in the methods or structures that are used to make them asymmetrical. One approach to introducing asymmetry into a loop is to couple an input pulse into the loop with a power-coupling ratio that differs from 50:50. One example of a NOLM that uses this form of asymmetry is described in the above-cited Doran and Wood articles.

Other approaches to introducing as asymmetry into a loop include locating rotated sections of birefringent fiber therein, or positioning an optical amplifier asymmetrically therein. An example of the former approach is described in "Optical Switching Using Fiber Ring Reflectors", J. Moores, et al., J. Opt. Soc. Am. B, Vol. 8, No. 3, pp. 594–601, March 1991. An example of the latter approach is described in the above-cited Fermann, et al. article.

Another known building block of optical fiber systems includes optical fibers that have dispersions that vary along the length thereof. These fibers can be used to effect the shapes of pulses if two conditions are met. First, the pulse wavelength needs to be greater than the zero dispersion wavelength (i.e., the anomalous dispersion regime). Second, the pulse intensity needs to be sufficiently high to generate self phase modulation. Pulses under these conditions are or will rapidly become what are known as optical solitons. The balance between dispersion and self-phase modulation is the defining mechanism for solitons. When the rate of change of dispersion in the fiber is equal to the attenuation rate of the fiber, the dispersion/SPM balance continues and the pulse width is constant. When the rate of change of dispersion is greater than the attenuation rate, the pulse width can slowly compress. An example of an optical fiber having such a variable dispersion is described in "Compensation of Soliton Broadening in Nonlinear Optical Fibers With Loss," K. Tajima, Optics Letters, v. 12, no. 1, p. 54–56, 1987.

Optical fibers having dispersions which decrease in the direction of propagation are commonly referred to as dispersion decreasing (DD) fibers, while those having dispersions which increase in the direction of propagation are known as dispersion increasing (DI) fibers. As explained in "A Single-Mode Fiber with Chromatic Dispersion Varying Along the Length", V. Bogatyrev, et al., Journal of Lightwave Technology, Vol.9, No. 5, pp. 561–566, May 1991, such fibers may be produced by changing the axial dopant concentration of the fiber, the diameter of the fiber core, or other fiber parameters. A particularly advantageous way of producing DD or DI fibers is described in copending, commonly assigned U.S. patent application Ser. No. 08/172,937, filed Dec. 27, 1993, which is hereby expressly incorporated herein by reference.

Prior to the present invention, DD and DI fibers were used primarily as pulse shaping devices, e.g., pulse compressors and decompressors. They also found use in maintaining the shape of optical solitons in long optical fiber waveguides having attenuations that were too large to be neglected. An application of the latter type is described in "Dramatically Improved Transmission of Ultra-Short Solitons Through 40 km of Dispersion Decreasing Fiber", A. J. Stentz, R. W. Boyd and A. F. Evans, Optics Letters, Vol. 20, no. 17, pp 1770–1772, Sept., 1995.

Prior to the present invention, however, DD and DI fibers have not been used to introduce directional asymmetry into NOLMs and NALMs. As a result, NOLMs and NALMs have now taken advantage of the many opportunities that DD and DI fibers create for using NOLMs and NALMs to perform new optical functions or to perform known optical functions in new and better ways.

SUMMARY OF THE INVENTION

In accordance with the present invention NOLM and NALM devices (hereinafter referred to generically as loop mirror devices or loop mirrors) are combined with dispersion decreasing fibers to produce new and powerful optical processing devices that may be used to perform new optical processing functions or to perform known optical processing functions more efficiently and/or more cost effectively.

Generally speaking, the present invention comprises a loop of optical fiber which has a first end having a relatively high dispersion value and a second end having a relatively low dispersion value, and which has a dispersion that decreases as a function of the distance from its high dispersion end. This dispersion is in the anomalous dispersion regime, i.e., the dispersion has a positive value for all the light wavelengths with which the fiber is used. In other words, the fiber is used with light having a wavelength that is greater than the zero dispersion wavelength of the fiber.

The present invention also includes an optical fiber coupler, such as a Multiclad® coupler made by Corning, Inc., having first and second loop ports coupled to respective ends of the loop and having first and second input/output (I/O) ports through which optical pulses may be coupled into and out of that loop. Together, the coupler and DD fiber loop constitute a loop mirror having a distributed directional asymmetry that allows the loop mirror to be used in ways that loop mirrors with non-distributed or lumped asymmetry structures cannot, thereby making possible the performance of new optical processing functions and the improved performance of known optical processing functions.

In accordance with one important feature of the invention, the DD fiber has a dispersion value which decreases monotonically from the high dispersion end of the loop to the low dispersion end thereof. In the preferred embodiment, the change in dispersion is distributed approximately continuously along the length of the loop, i.e., without step-like changes in either the diameter of the core of the fiber or the concentration of dopant compounds. For many applications, however, it is acceptable to have the change in dispersion distributed over a plurality of discrete steps that are located at predetermined intervals along the length of the fiber.

Advantageously, the dispersion of the fiber may be a function of distance, i.e., have an axial dispersion profile, which is specially optimized for particular loop mirror applications. In the case of a DD fiber having discrete dispersion steps, the axial dispersion profile may be selected so that a predetermined relationship exists between the lengths of the steps and the soliton periods or reaction lengths of the solitons with which the loop mirror is used. In the case of a DD fiber having a continuously changing dispersion, a corresponding relationship may be established between the local dispersion value and the local solution periods of the solitons. Further, the number and sizes of the steps or the rate of change of dispersion may be selected so that the dispersion profile of the fiber is nonlinear, e.g., has a dispersion which decreases approximately exponentially..Thus, the dispersion profile of the fiber used in the loop mirror of the invention allows that loop mirror to produce a variety of asymmetrical effects that cannot be produced with loop mirrors known prior to the present invention.

The use of a DD fiber in a loop mirror also provides the advantage that it presents to the ports of its coupler both a first, high dispersion end and a second, low dispersion end. Because of these differing dispersion values, optical pulses which are in the soliton regime may be divided into optical solitons of different orders, even when the coupler provides a 50:50 coupling ratio. An input pulse may, for example, be divided into a fundamental or first order soliton that propagates in the DD direction and a third order soliton that propagates in the DI direction. Because solitons having integer order numbers change shape or evolve in a periodic manner as they propagate along a fiber, loop parameters such as the length, effective area, dispersion profile, etc., of the fiber affect the ways in which solitons that have propagated around the loop interact with one another on their return to the coupler. This, in turn, allows the loop mirror to produce different effects on different types of input pulses, causing some to interfere constructively and be reflected while causing others to interfere destructively and be transmitted, depending upon input pulse parameters such as amplitude, temporal width, etc. In other words, the above-mentioned variables, among others, define sets of loop parameters which allow the loop mirror of the invention to discriminate between different types of input pulses based on differences in their pulse parameters.

Pulses within the soliton regime may also be divided into different order solitons which have non-integral or fractional order numbers. Such solitons also evolve during propagation, but in a nonperiodic manner. Like integer order solitons, however, they are subject to self phase modulation effects. Even pulses that are not within the soliton regime, i.e., pulses that are within the linear regime and have order numbers less than about ½, may be divided into different order pulses which evolve during propagation. Unlike solitons, however, they are not subject to self phase modulation effects.

Because of their ability to interact with and/or offset one another, the loop parameters of the loop mirror of the invention together define a multidimensional loop parameter space from which may be selected combinations of loop parameters that have substantially similar effects on input pulses. Because, for example, the point along a fiber at which a higher order soliton recovers its original width and/or accumulates a 180 degree phase shift depends on both the dispersion profile and the effective area of a fiber, this point may be made to occur at a particular point in a fiber by various different combinations of dispersion profile and effective area. Similarly, other combinations of loop parameters, such as initial and final dispersion values, rate of change of dispersion, attenuation, etc. may be used to produce a similar effect at the same or some other point in the fiber. It will therefore be understood that, while the present description discloses particular advantageous combinations of loop mirror parameters, these combinations are exemplary only, and are equivalent to other combinations which produce substantially similar results in substantially similar ways.

In one particularly important embodiment Of the invention, the loop parameters are selected so that the loop mirror may be used to distinguish between and separate optical pulses on the basis of whether the temporal widths of those pulses are greater than or less than a predetermined temporal width. In this embodiment, which will be referred to as the pulse width switching (PWS) embodiment, a 50:50 coupler is used to divide input pulses into two counter propagating component pulses with equal energies. The loop length and rate of change of dispersion are selected so that the loop has differing effects on these component pulses depending upon whether the input pulse from which they were derived had a temporal width greater or less than the predetermined temporal width.

More particularly, the loop length and rate of change of dispersion are selected so that relatively broad pulses have reaction lengths so long that they can respond only to the average value of the dispersion around the loop and, consequently, cannot form solitons of different orders. As a result, the two pulses are affected in the same way by their propagation around the loop and do not return to the coupler with a directional phase difference. Under these conditions, the returning pulses are approximately in phase and are therefore reflected by the loop mirror. Relatively narrow pulses, on the other hand, have reaction lengths short enough that they can respond to the instantaneous, local value of the dispersion around the loop (stepped or continuous) and are able to form solitons of different orders. As a result, provided that their amplitudes are high enough, the two pulses are affected differently by their propagation around the loop and return to the coupler with a directional phase difference of approximately 180 degrees (pi radians). Under these conditions, the returning pulses will be transmitted rather than reflected by the loop mirror.

One application for the pulse width switching embodiment of the invention includes loop mirrors which are able to separate wide and narrow temporal return-to-zero (RZ)

data rate channels that use the same fiber. Another application is a filter for removing amplified spontaneous emission (ASE) noise from a train of optical pulses.

In another important embodiment of the invention the loop parameters are selected so that the loop mirror may be used to distinguish between and separate optical pulses on the basis of whether these pulses have amplitudes which are greater or less than a predetermined amplitude. In this embodiment of the invention, which will be referred to as the pulse amplitude switching (PAS) embodiment, a 50:50 coupler is again used to divide input pulses into two counter propagating component pulses. In this case, however, the loop parameters are selected so that solitons of different orders are formed only if the input pulses have an amplitude greater than a predetermined minimum amplitude.

More particularly, for input pulses having amplitudes greater than the predetermined minimum, solitons of different orders form and are able to accumulate a 180 degree phase difference upon returning to the coupler, provided that they do not have temporal widths that are too great. Under this condition, the loop mirror of the invention transmits the input pulse. For input pulses having amplitudes less than the predetermined minimum, however, the counter propagating pulses are not solitons (although they have different order numbers) and are not able to accumulate any substantial phase difference as a result of their propagation around the loop. Under these conditions, the loop mirror of the invention reflects the input pulse.

One application for the pulse amplitude switching embodiment of the invention includes a noise filter which separates high amplitude data pulses from low amplitude noise pulses and thereby effectively increases the signal-to-noise ratio of an optical system.

DESCRIPTION OF THE DRAWINGS

Other objects and advantages of the invention will be apparent from the following description and drawings, in which:

FIG. 3 is a table showing equations which govern the operation of the loop mirror of the invention;

FIG. 4 is a propagation diagram which shows the counterpropagation of solitons of different orders for the pulse width switching embodiment of the invention;

DESCRIPTION OF THE PREFERRED EMBODIMENTS

Figure 1:
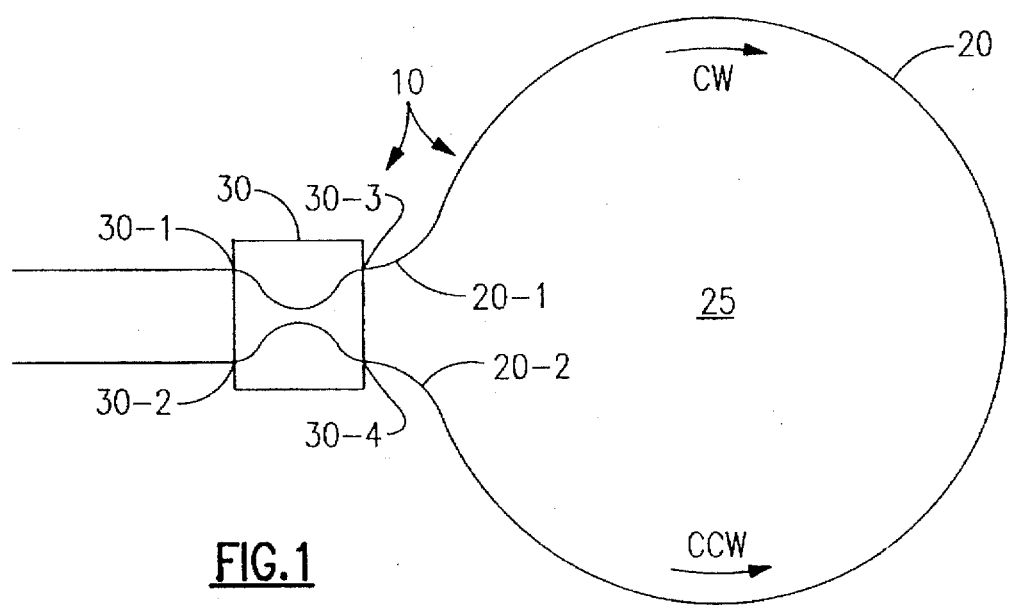
FIG. 1 shows a non linear optical loop mirror constructed in accordance with the present invention.

Referring to FIG. 1 there is shown a nonlinear optical loop mirror (NOLM) 10 which has been constructed in accordance with the present invention. Loop mirror 10 includes an optical fiber 20 having a first end 20-1 and a second end 20-2. Loop mirror 10 also includes an optical coupler 30 having a first pair of I/O ports 30-1 and 30-2, and a second pair of I/O ports 30-3 and 30-4. When fiber 20 and Coupler 30 are connected as a loop mirror, fiber 20 is formed into a loop 25 whose ends 20-1 and 20-2 are connected to coupler I/O ports 30-3 and 30-4, respectively. Remaining I/O ports 30-1 and 30-2 are connected to the external devices or fibers with which loop mirror 10 is to be used. Because of their association with the ends of loop 25, I/O ports 30-3 and 30-4 will hereinafter be referred to loop ports.

Coupler 30 is preferably a fiber coupler Such as a Multiclad® coupler made by Corning, Inc., which serves to couple optical pulses bidirectionally between I/O ports 30-1 and 30-2 and loop 25. More particularly, coupler 30 serves to divide optical pulses entering either of I/O ports 30-1 and 30-2 into two component optical pulses which propagate around loop 25 in opposite directions, i.e., counterpropagate. Coupler 30 also serves to receive returning component pulses and to divide the energy thereof between I/O ports 30-1 and 30-2 in accordance with the relative amplitudes, widths and phases thereof. To the extent that returning pulses are directed out of the same I/O through which they entered, they are said to be "reflected" or "unswitched"; to the extent that returning pulses are directed out of the other I/O port, they are said to be "transmitted" or "switched". Because coupler 30 is of a type that is known to those skilled in the art, it will not be described in detail herein.

In accordance with the present invention, fiber 20 comprises a fiber having a dispersion D (often referred to as group velocity dispersion or GVD) that varies as a predetermined function of the distance Z from one of the ends thereof. In the preferred embodiment, dispersion D has a maximum value $D_{MAX}$ at end 20-1 of fiber 20 and a minimum value $D_{MIN}$ at end 20-2 thereof and has a magnitude that decreases monotonically as a function of the distance from end 20-1. Accordingly, it will be seen that fiber 20 comprises a dispersion decreasing (DD) fiber for optical pulses that propagate around loop 25 in the clockwise or DD direction, as shown in FIG. 1, and to comprise a dispersion increasing (DI) fiber for optical pulses that propagate around loop 25 in the counterclockwise or DI direction, as shown in FIG. 1. As a result, fiber 20 of the invention introduces into the loop mirror of FIG. 1 a directional asymmetry that causes counter propagating optical pulses to be affected differently by their propagation around loop 25. As will be explained more fully later, this directional asymmetry allows the loop mirror of the invention not only to perform optical functions that have previously been performed with other asymmetry introducing structures, such as birefringent fibers, but to perform those functions better.

Figure 2A:
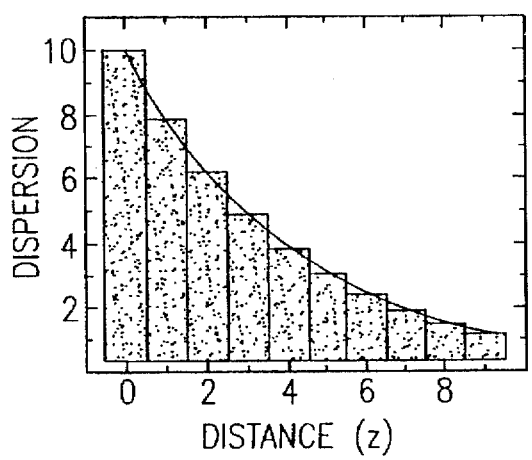
FIGS. 2A and 2B are graphs showing the dispersion, as a function of distance, for two dispersion decreasing fibers suitable for use in the loop mirror of FIG. 1.
Figure 2B:
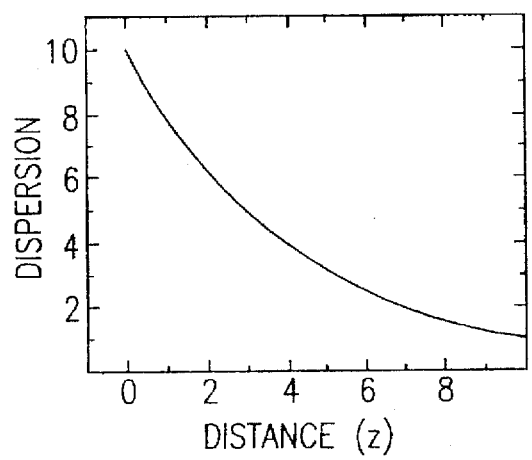

In the preferred embodiment, the dispersion of fiber 20 decreases approximately exponentially as a function of distance Z in accordance with equation 1 of FIG. 3. When plotted as a function of distance, dispersion D has the general appearance shown in FIGS. 2A or 2B. In the case of FIG. 2A, dispersion D decreases monotonically in a plurality of discrete steps which comprise segments of fiber having predetermined respective lengths and predetermined approximately constant respective dispersions. In the case of FIG. 2B, the dispersion decreases monotonically in an approximately continuous manner. In both cases, however, the decrease in dispersion is distributed along substantially the entire length of loop 25. As a result, pulses propagating around loop 25 are exposed to a variable dispersion gradient or dispersion profile that extends from one end of loop 25 to the other.

A fiber having the variable dispersion profile shown in FIG. 2A may be produced in a variety of ways. One of these includes the drawing of the fiber from a specially designed preform in such a way that the fiber has a constant outside diameter, but a core area that decreases in the DD direction.

Another of these includes the drawings of the fiber from a specially designed preform that is constructed so that the fiber has a dopant level and, consequently, an index of refraction that varies as a function of distance along the length thereof. Examples of techniques for drawing DDF fibers of these types are described in copending U.S. patent application Ser. No. 08/172,937, filed Dec. 27, 1993.

Among fibers that have dispersion profiles such as those shown in FIGS. 2A and 2B, there are many possible combinations of loop parameters which influence the way that the loop affects optical pulses propagating therethrough. Included among these loop parameters are: the length of the fiber, the attenuation of the fiber, the dispersion values at the ends of the fiber; the mathematical form and coefficients of the dispersion function, particularly the rate of change of dispersion, the number and lengths of the segments making up the steps (in stepped embodiments such as that shown in FIG. 2A), the effective area of the fiber, the nonlinear optical coefficient and the cross-sectional area of the core of the fiber. Of the last mentioned areas, the core area is simply the geometrical cross-sectional area of the core portion of the fiber. The effective area of the fiber, on the other hand, takes into account not only the geometrical area of the core but also the distribution of the optical field in the fiber. Together with the nonlinear index of refraction $N_2$ of the fiber, the effective area of the fiber determines the nonlinear coefficient of the fiber, a quantity shown as G in equation 2 of FIG. 3.

Depending upon whether or not coupler 30 is regarded as a part of the loop, the loop parameters may be regarded as including or not including the coupling ratio of coupler 30. Because the remaining loop parameters themselves provide any necessary directional asymmetry, it will not ordinarily be necessary to use coupling ratios other than a 50:50 coupling ratio for this purpose. As a result, the present invention will ordinarily use a 50:50 coupling ratio, (thereby effectively eliminating the coupling ratio as a loop parameter), although other coupling ratios may be used, if desired.

In addition, there are a number of possible combinations of temporal and spectral pulse parameters which influence the way that a pulse is affected by particular combinations of loop parameters. Included among the temporal parameters of a pulse are its amplitude or peak power, its regime (soliton vs. linear), its order and its temporal width, the latter often being defined by its "full width half magnitude" or "FWHM". Included among the spectral parameters of a pulse are its central wavelength, its spectral width, and its chirp.

In accordance with the present invention, it has been discovered that particular combinations of loop parameters can be used to distinguish optical pulses having one set of pulse parameters from those having another set of pulse parameters. This ability to distinguish between pulses with different pulse parameters, in turn, allows the loop mirror of the invention to separate, sort or route pulses based on those differences. Once this has been done, the separated pulses may be further differentially processed by, for example, amplifying one and not the other, compressing one and not the other, etc. Thus, the loop mirror of the invention comprises a powerful general purpose optical processing device that may be used in a variety of different applications.

In a first, pulse width switching embodiment the loop mirror of the invention is used to separate pulses on the basis of differences in the temporal widths thereof, provided that their amplitudes are great enough to be in the soliton regime. More particularly, the loop mirror is used to reflect (or not switch) input pulses which have temporal widths that are greater than a predetermined minimum width and to transmit (or switch) at least a substantial fraction of the energy of input pulses which have temporal widths that are less than that minimum width. The manner in which this is accomplished will now be described with reference to FIGS. 1 and 4.

In configuring the loop mirror of FIG. 1 for use as a pulse width dependent switch, its loop parameters are selected on the basis of the pulse parameters of the pulses that are to be switched. This selection may be summarized as follows: The length of the loop and the number and lengths of the dispersion steps are selected so that pulses having widths greater than the minimum width (wide pulses) have a reaction length which is long in relation to the lengths of the steps, but so that pulses having less than the minimum width (narrow pulses) have a reaction length which is short in relation to the lengths of the steps. (In the case of fiber with a continuously decreasing dispersion, narrow pulses have a reaction length which is short in relation to the local dispersion value, while wide pulses do not.) For pulses having amplitudes that are great enough to be in the soliton regime, this is comparable to saying that wide pulses have soliton periods $Z_0$ which are long in relation to the length of the loop, while narrow pulses do not.

Assuming, for example, that the minimum pulse width is 7.5 picoseconds (ps), the loop may have a length of 8.8 km with a dispersion that decreases from −9 to −1 $ps^2/km$ in 8 steps, with each step comprising a segment of fiber having a length of 1 km and a dispersion which is approximately constant along the length thereof. With such a pulse and such a loop, it has been found that the percentage of the energy of a pulse entering I/O port 30-1 which is transmitted to I/O port 30-2 falls substantially as the width of the input pulse rises above 7.5 ps, falling to less than 8% as the pulse width approaches 9 ps. Conversely, it has been found that the percentage of the input energy which is transmitted increases substantially as the width of the input pulse falls below 7.5 ps, rising to more than 50% as the pulse width approaches 5 ps. Pulses which have amplitudes that are too low to be in the soliton regime (i.e., are in the linear regime) are reflected without regard to their widths. For reasons which will described more fully later, the just described combination of loop parameters is only an exemplary one of a number of possible combinations of loop parameters which will produce the just described result.

The reasons why the loop mirror of the invention produces the above-described pulse width switching effect will now be described. Given the above-described relationships of segment length and temporal width, relatively wide pulses, such as those with temporal widths greater than 7.5 ps, have a reaction length which is too great to allow them to react to the individual steps of the DD fiber. This assures that, when coupler 30 divides an input pulse at I/O port 30-1 into two counterpropagating component pulses, the two component pulses both react to the average of the dispersion values of the steps, rather than to the individual dispersion values thereof. This, in turn, causes the counterpropagating component pulses to be similarly affected by their propagation around the loop. As a result, the two broad component pulses return to the coupler with similar amplitudes and widths and in an approximately in-phase relationship with respect one another and, consequently, are reflected.

As relatively narrow input pulses are applied to I/O port 30-1, however, their shorter reaction length allows them to respond to the individual steps or local dispersion values of the DD fiber. Then, provided that an input pulse has an amplitude in the soliton regime, it will be divided into two counterpropagating solitons of different orders which are affected differently by their propagation around the loop. In accordance with the present invention, a suitable combination of loop parameters causes the returning different order solitons to return to coupler 30 with similar amplitudes and widths but in a generally out-of-phase relationship (e.g., with a phase difference on the order of 180 degrees or pi radians). As a result, the two returning solitons tend to be transmitted rather than reflected.

The above-mentioned result is best understood with reference to equation (2) of FIG. 3. The latter equation shows the relationship between the order number N of a soliton, the peak power $P_o$ and temporal width $T_o$ thereof and the local dispersion D of the fiber in which the soliton is propagating. This equation shows that, when a pulse having a combination of amplitude and width within the soliton regime is split into two component pulses with equal energies and applied to a fiber having ends with differing dispersions, the result can be a pair of counterpropagating component solitons which have different order numbers, the difference in order depending on the difference in the dispersion values seen by the component pulses. If different order solitons are generated, they will, initially at least, have equal amplitudes and equal widths. During propagation, however, higher order solitons will undergo a change in their shape, periodically recovering their original shape at distances related to their soliton periods, while first harder solitons do not undergo such a periodic change in shape. This difference in evolution is illustrated in FIG. 4.

In the case of pulses which are relatively broad, both component pulses "see" a loop having the same dispersion value. This is because their reaction lengths are too great to be affected by the individual dispersion steps and, consequently, both component pulses see a loop having a dispersion equal to the average of the dispersions of the steps. Under these conditions, no different order solitons are formed. As a result, the component pulses are affected in the same way by their propagation around the loop and, consequently, return to coupler 30 in a generally in-phase relationship. Under these conditions, coupler 30 directs most of the returning energy to I/O port 30-1 and the input pulse may be said to be reflected.

In the case of pulses which are relatively narrow, on the other hand, the component pulses "see" loops having different dispersions. This is because their shorter reaction lengths allow them to be affected by the individual dispersion steps, allowing one component pulse to see $D_{MAX}$ while the other sees $D_{MIN}$. As a result, the input pulse is divided into two component solitons which have equal energies but different orders. One of these may for example be a first order soliton which propagates in the DD or CW direction and undergoes no substantial change in amplitude or width. The other may be a third order soliton which propagates in the DI or CCW direction and spends much of its propagation time with an amplitude greater than that with which it entered the loop and with a width that varies as a periodic function of distance. This periodically varying amplitude and width may be seen in FIG. 4.

Because the third order soliton spends a substantial fraction of its propagation time with a higher amplitude than the first order soliton, it is more affected by the non-linear optical properties of the fiber than the first order soliton. As a result, it undergoes a greater degree of self phase modulation than the first order soliton. This, in turn, causes the first and third order solitons to return to the coupler in a generally out of phase relationship. For an appropriate choice of loop length and rate of change of dispersion, the difference in the phase of these solitons may be made approximately equal to 180 degrees while the temporal width thereof returns to the equal widths with which they entered the loop. To the extent that these conditions are met, the energy of the input pulse will be transmitted through coupler I/O port 30-2, and the input pulse may be said to be transmitted.

In instances in which the pulses to be separated on the basis of differences in their temporal widths do not have width differences as great as that given in the foregoing example, the pulse width switching embodiment will not switch with as high a contrast as the foregoing example. This is because the reflection/transmission characteristic has a transition region or "knee" which is not infinitely sharp, i.e., which divides the characteristic into two regions separated by a sharply defined boundary width. Such a sharply defined boundary value is not essential to the operation of the invention, however, so long as the pulses to be separated fall on opposite sides of the transition region. It will therefore be understood that, in its broadest sense, the minimum switching width refers not only to a single precisely defined boundary width, but also to a boundary region of finite width within which the switch has too low a contrast value to be effective as a switch.

Figure 5:
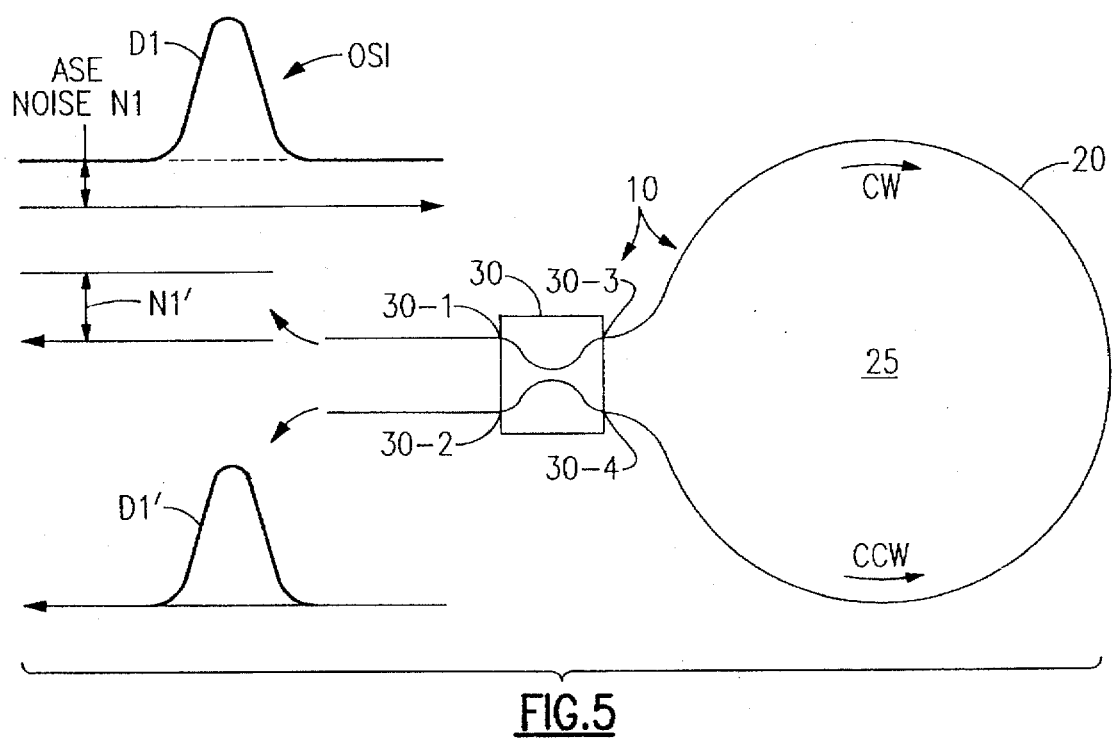
FIGS. 5 and 6 illustrate specific applications of the pulse width switching embodiment of the invention.

Referring to FIG. 5, there is shown one example of a specific application of the pulse width switching embodiment of the loop mirror of the invention, namely: a noise filter for filtering amplified spontaneous emission (ASE noise). The loop mirror of FIG. 5 will be understood to be generally similar to that shown in FIG. 1, like functioning parts being similarly numbered, but to have a combination of loop parameters which allows it to differentiate between pulses on the basis of differences in their widths.

In FIG. 5, the input of loop mirror 10 comprises an optical signal OS1 that includes a relatively narrow data pulse D1 and an ASE noise component N1 that may be visualized as a relatively wide pulse. Provided that the former has a temporal width that is less than the minimum width at which loop mirror 10 transmits input pulses, and that the latter has a width greater than that minimum width, these two components will become separated as a result of their encounter with loop mirror 10. More particularly, data pulse D1 will be largely transmitted by loop mirror 10 and will exit coupler 30 at I/O port 30-2 as a pulse D1' from which most ASE noise has been filtered. At the same time, noise "pulse" N1 will be largely reflected by loop mirror 10 and will exit coupler 30 at I/O port 30-1 as a noise pulse N1' from which most of the data pulse has been removed. Because the separating action of loop mirror 10 also requires that the pulse to be transmitted have an amplitude in the soliton regime, the loop mirror of FIG. 5 also tends to reflect and thereby remove from the transmitted signal at I/O port 30-2 low amplitude noise pulses which may have unintentionally become entrained in input signal OSI. Thus, the loop mirror of FIG. 5 will be seen to act as a filter for both ASE noise and low amplitude pulse noise.

Figure 6:
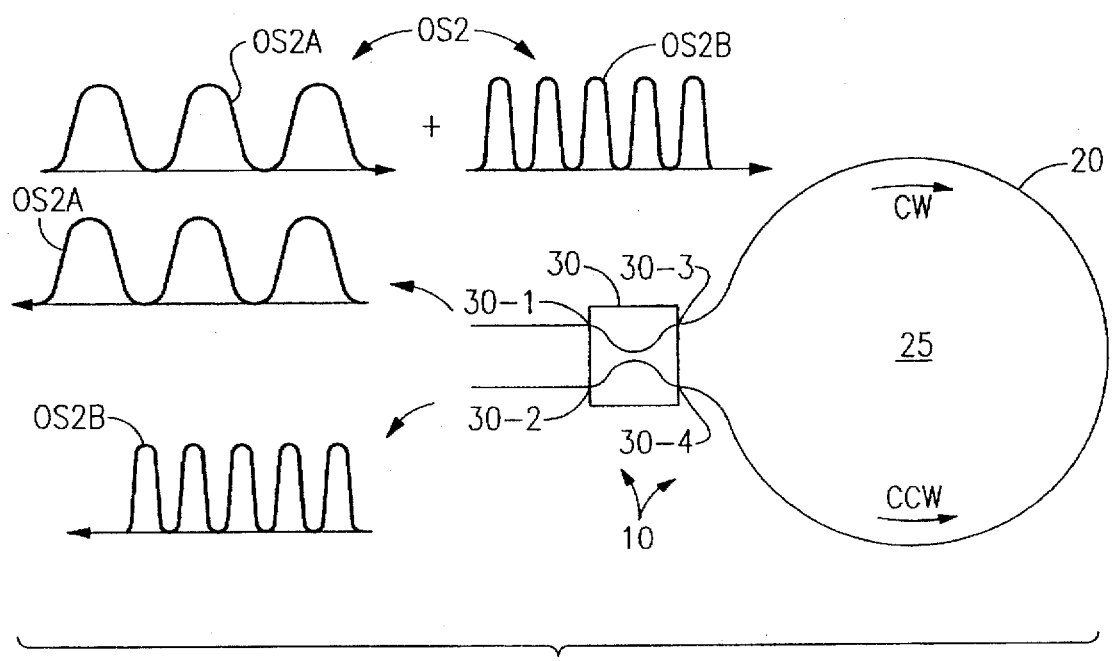

Referring to FIG. 6, there is shown another exemplary application of the pulse width switching embodiment of the loop mirror of the invention. On the application shown in FIG. 6, the loop mirror serves as a return to zero (RZ) demultiplexer which separates two data channels made up of pulse trains that include pulses with different widths and different repetition rates.

In FIG. 6, the input of loop mirror 10 comprises an optical signal OS2 that includes a first data channel which takes the form of a pulse train OS2A made up of pulses that are relatively wide and have a relatively low repetition rate and a second data channel which takes the form of a pulse train OS2B made up of pulses that are relatively narrow and have a relatively high repetition rate. Upon entering loop mirror 10 the pulses making up these two channels will be separated on the basis of their widths, provided that the pulses of the pulse train to be transmitted have amplitudes that are in the soliton regime. More particularly, the relatively broad pulses of input pulse train OS2A will propagate around the loop and be reflected out of coupler I/O port 30-1, while the relatively narrow pulses of input pulse train OS2B will propagate around the loop and be transmitted out of coupler I/O port 30-2. Because the manner in which this separation takes place has already been described, the embodiment of FIG. 6 will not be further discussed herein.

In a second, pulse amplitude switching embodiment, the ability of the loop mirror of the invention to discriminate between pulses on the basis of their pulse parameters is used to separate pulses on the basis of differences in the amplitudes or peak powers thereof. More particularly, the loop mirror is used to reflect input pulses having amplitudes that are less than a predetermined value $A_{MIN}$ and to transmit pulses having amplitudes that are greater than that predetermined value, provided that their widths are not so great that the above-described pulse width switching effect comes into play. Generally speaking, the value of $A_{MIN}$ is selected so that input pulses having amplitudes above this value are in the soliton regime while input pulses having amplitudes below this value are in the linear regime. The manner in which this is accomplished will now be described with reference to FIGS. 7 through 9.

In configuring the loop mirror of FIG. 1 for use as a pulse amplitude dependent switch, its loop parameters are again selected on the basis of the pulse parameters of the pulses that are to be switched. This selection may be summarized as follows: The length of fiber 20 and the average dispersion thereof are used to define the optimum pulse width-generally independently of the other parameters. These parameters also influence the peak power needed to get a 180 degree phase change. The average dispersion, fiber length and pulse width together determine the rate of change of dispersion, which will ordinarily be relatively gradual. All of these variables affect the component pulse order numbers at which the highest contrast switching will occur. Because of the interdependency of these parameters, there may be many different combinations thereof which yield generally similar results.

Figure 7:
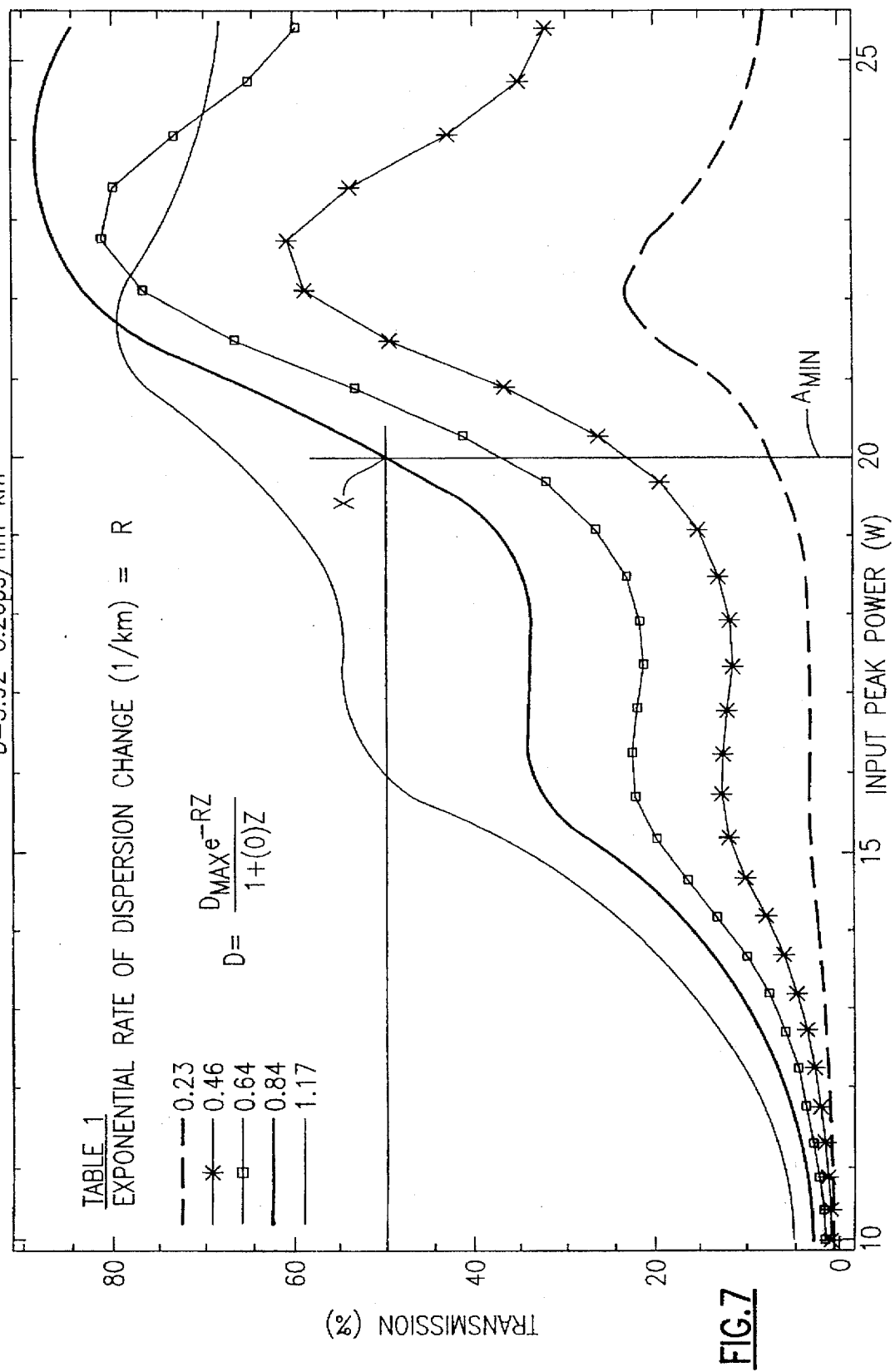
FIG. 7 shows % energy transmission as a function of input power for the pulse amplitude switching embodiment of the invention.

Referring to FIG. 7 there is shown a family of curves which depict the percentage of the energy of an input pulse that is transmitted by the loop mirror of the invention as a function of the peak amplitude or peak power of that pulse. All of these curves apply to a loop having a length of 0.35 km, a pulse width of 1 ps and a dispersion that varies in a continuous manner from 3.92 to 5.26 ps/nm-km. These curves differ from one another, however, in that each shows the percentage transmission for different respective exponential rates of change of dispersion R, the values of these different rates of change being shown in Table 1 of FIG. 7 together with an indication of the curves to which they apply. It will be understood that families of curves such as that shown in FIG. 7 will exist for each different combination of loop length, pulse width and average dispersion value.

From FIG. 7 it will be seen that a variety of different switching effects may be produced by selecting different values for rate of change R. If, for example, one wishes a switching action which yields the highest total percentage of energy switched, one would choose R=0.84. If, on the other hand, one wishes a switching action which most sharply distinguishes between pulses which are above and below $A_{MIN}$, one might choose R=0.46.

Figure 9:
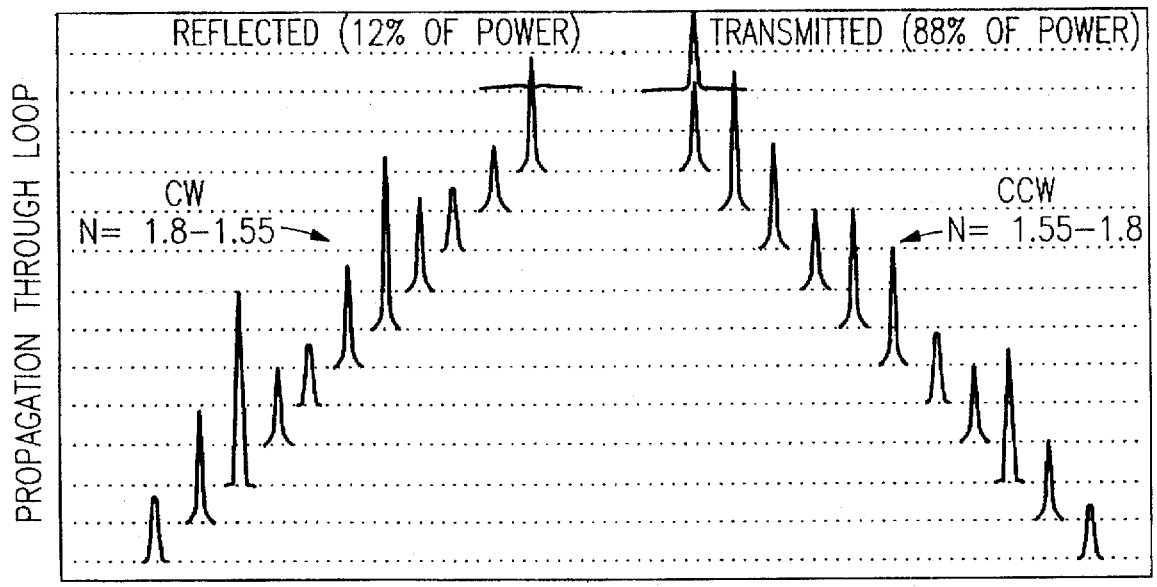
FIGS. 8 and 9 are propagation diagrams which show the counterpropagation of different order pulses for the pulse amplitude switching embodiment of the invention.
Figure 8:
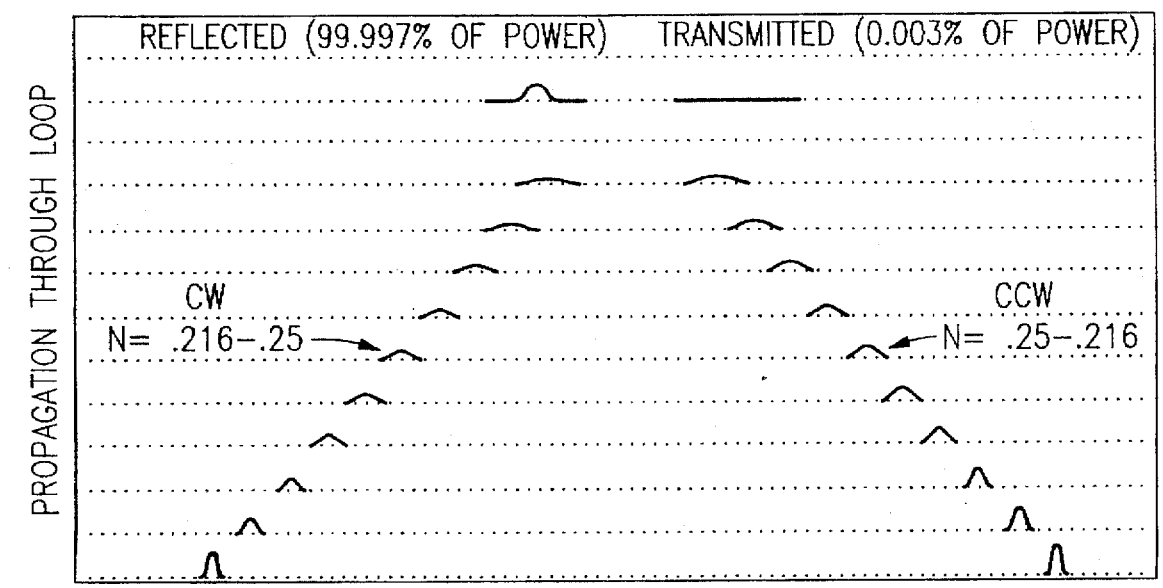

The reasons why the loop mirror of the invention produces the illustrated pulse amplitude dependent switching effect will now be described with reference to FIGS. 8 and 9, both of which assume an exponential rate of change of dispersion of 0.84. FIGS. 8 and 9 also assume that $A_{MIN}$ has a peak power of 20 watts and corresponds generally to the point below which less than 50% of the input power is switched, and above which more than 50% of the input power is switched. The loop mirror is therefore set to switch at the operating point labelled x in FIG. 7.

Referring to FIG. 8, there are shown the counterpropagating pulses which are produced when a 1 ps input pulse having a peak power of 10 watts is applied to a loop mirror having the last mentioned loop parameters. From FIG. 8 it will be seen that the clockwise (CW) and counterclockwise (CCW) propagating component pulses have order numbers in the range of from 0.216 to 0.250 and are, therefore, both in the linear regime. As a result, the component pulses are not solitons and are not subject to the self phase modulation effect; they simply propagate around the loop and return to the coupler in an in phase relationship. Although the component pulses undergo somewhat different width and amplitude evolutions as a result of the differing dispersion profiles encountered thereby, the difference is not significant and manifests itself merely as an insignificant distortion of the shape of the pulse that is reflected by the loop mirror.

Referring to FIG. 9, on the other hand, there are shown the counterpropagating pulses which are produced when a 1 ps input pulse having a peak power of 23.5 watts is applied to a loop mirror having the last mentioned loop parameters. From FIG. 9 it will be seen that the CW and CCW propagating component pulses have order numbers in the range of 1.55 to 1.8 and are, therefore, in the soliton regime. As a result, the component pulses are solitons of different orders, both of which are subject to the self phase modulation effect. Because they evolve differently as a result of the different dispersion profiles encountered thereby, however, they spend differing fractions of their propagation times in the nonlinear region of the fiber. This, in turn, causes a substantial difference in phase to occur between them as they complete their propagation around the loop. With the assumed loop parameters, this difference in phase is approximately 180 degrees and occurs at a point at which the component solitons have approximately equal amplitudes and widths. As a result, a relatively high percentage of the input pulse energy (88%) is directed through port 30-2 while a relatively low percentage of the input pulse energy (12%) is directed through port 30-1, i.e., the pulse is effectively transmitted rather than reflected.

In instances in which the pulses to be separated on the basis of differences in their peak amplitudes do not have amplitude differences as great as that given in the foregoing example, the pulse amplitude switching embodiment will not switch with as high a contrast as the foregoing example. This is because a transmission characteristic, such as that shown in FIG. 7, has a transition region or "knee" which is not infinitely sharp, i.e., which divides the characteristic into two regions separated by a sharply defined boundary amplitude. Such a sharply defined boundary value is not essential to the operation of the invention, however, so long as the pulses to be separated fall on opposite sides of the transition region. It will therefore be understood that, in its broadest sense, the switching threshold $A_{MIN}$ refers not only to a single precisely defined boundary value, but also a boundary region of finite width within which the switch has too low a contrast value to be effective as a switch.

Figure 10:
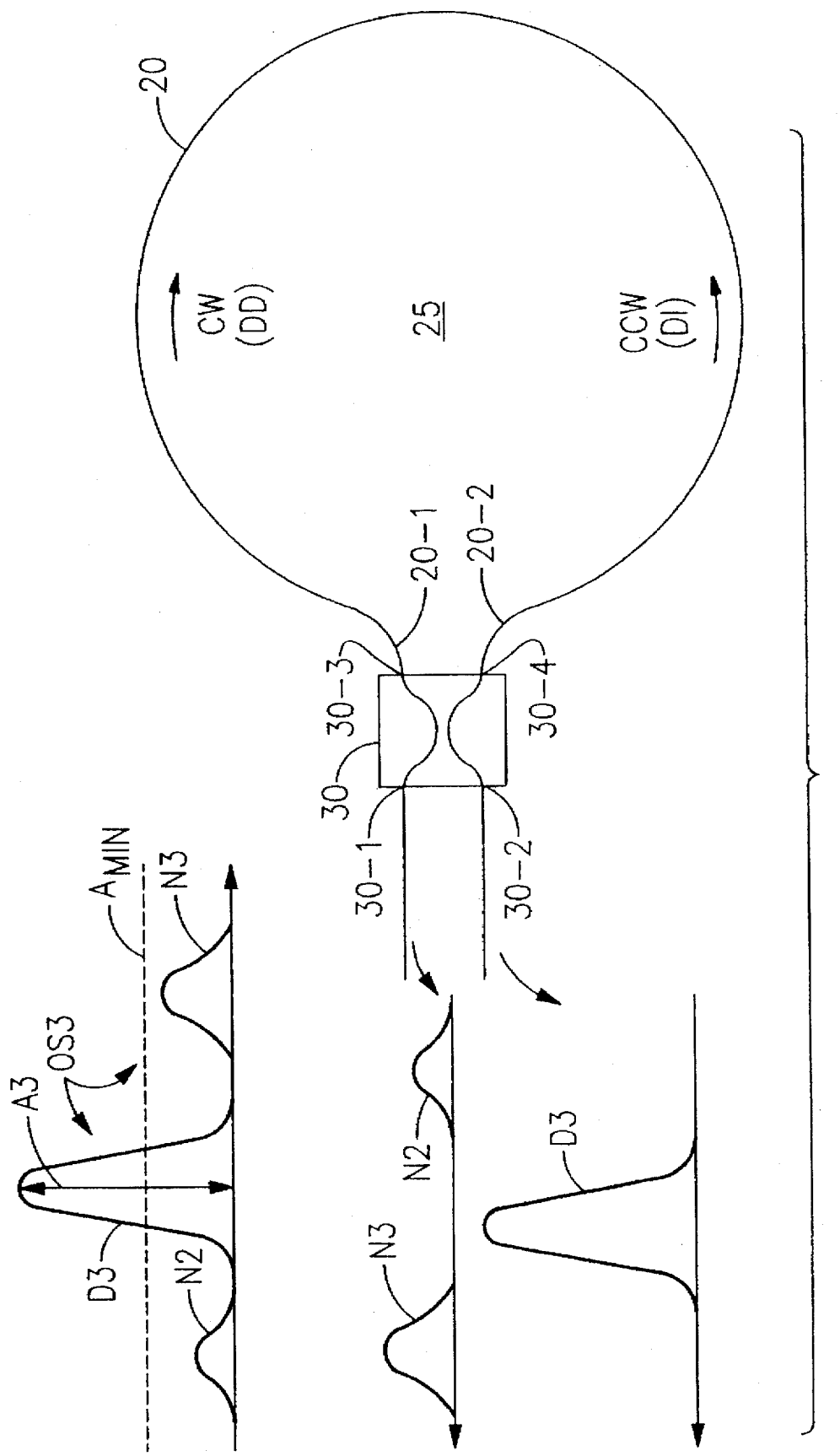
FIG. 10 illustrates a specific application of the pulse amplitude switching embodiment of the invention.

Referring to FIG. 10 there is shown one example of a specific application of the pulse amplitude switching embodiment of the loop mirror of the invention, namely: a filter for removing low intensity pedestal "pulses" from a train of data pulses. The loop mirror of FIG. 10 is generally similar to that shown in FIG. 1, but has loop parameters which are selected to cause it to differentiate pulses on the basis of differences in their amplitudes, i.e., their peak powers or intensities.

In FIG. 10 the input signal of the loop mirror comprises an optical signal OS3 that includes a data pulse D3 having an amplitude A3 that exceeds the minimum amplitude $A_{MIN}$ at which pulses may be transmitted by the loop mirror. Optical signal OS3 also includes two background noise pulses N2 and N3 which have amplitudes that are less than $A_{MIN}$. For the sake of clarity, all illustrated pulses are shown as having similar temporal widths. Such pulses may, for example, comprise non data bearing pulses which are the result from unintended cross coupling between fibers, dispersive wave generation or the result of amplification effects.

Because data pulse D3 has an amplitude that exceeds the amplitude minimum for the loop mirror, it will be split into component solitons of different orders which return to coupler 30 in a generally out of phase relationship as a result of their differing temporal evolutions, as shown in FIG. 8. This, together, with similarities in the amplitudes and widths of the returning component solitons, assures that pulse D3 is transmitted to I/O port 30-2. Noise pulses N2 and N3, however, are split into component pulses which are not solitons. As a result, the component pulses propagate linearly around the loop without accumulating any substantial difference in phase (i.e., no self phase modulation) and, consequently, are reflected through I/O port 30-1, as shown in FIG. 9. Thus, the loop mirror of FIG. 10 serves as a filter which allows low amplitude background or noise pulses to be efficiently separated from high amplitude data pulses.

In view of the foregoing it will be seen that, in spite of the different uses to which they are put, the pulse amplitude and pulse width switching embodiments of the loop mirror of the invention make use of substantially the same direction dependent phase shifting effect. Stated differently, the pulse amplitude and pulse width switching embodiments of the invention accomplish different end results because they use the same direction dependent phase shifting effect in conjunction with different combinations of loop and pulse parameters.

In selecting the combinations of loop and pulse parameters that are used in practicing the present invention, care must be exercised to take into account the interactions and potential tradeoffs between the various loop parameters. In the case of the pulse amplitude switching embodiment, for example, the length of the fiber and the effective area thereof interact so that the two can be traded off against one another in ways that allow the higher order soliton to recover its original width on returning to the coupler. Both of these parameters, in turn, are affected by the dispersion values at the first and second ends of the fiber and the mathematical form and coefficients of the dispersion as a function of distance along the fiber. It will, therefore, in general be necessary to calculate a set of loop parameters on the basis of a set of simultaneous equations which together define all of the requirements to be met. Because computer programs (including numerical approximation programs) suitable for use in solving such sets of simultaneous equations are known to those skilled in the art, such solutions will not be discussed in detail herein.

In addition, the calculation of a set of loop parameters must take into account the dynamic changes that occur in the pulse parameters as a pulse propagates around the loop. Referring to equation (2) of FIG. 3, for example, it will be seen that, as a soliton pulse encounters a sequence of different local dispersion values during propagation, both its soliton period and its order number can change. A soliton that begins propagating as a soliton with one order number can become a soliton with a different order by the time it returns to the coupler. In addition, since solitons can have order numbers which are either integral or non-integral (fractional), solitons can evolve in ways that are either periodic or non periodic.

Propagation dependent effects of the above-described type are particularly complex in cases in which both of the counterpropagating solitons are higher order solitons. This is because, in such cases, both of the solitons have waveforms that vary as periodic functions of normalized distance variable $z/z_o$ that indicates the fractions or multiples of a soliton period that correspond to a particular location within the loop. Accordingly, while the present invention in its broadest aspect encompasses different order solitons of any combination of orders, it preferably encompasses different order solitons in which one of the solitons is a first order or nearly a first order soliton.

While this invention has been explained with reference to the structure disclosed herein, it is not confined to the details set forth and this application is intended to cover any modifications and changes as may come within the scope of the following claims:

What is claimed is:

1. An optical fiber apparatus for reflecting optical pulses having a temporal width greater than a predetermined temporal width and transmitting optical pulses having a width less than said predetermined temporal width, comprising:
   a) an optical fiber including a first end having a relatively high dispersion value and a second end having a relatively low dispersion value, said fiber having a dispersion which decreases monotonically from said first end to said second end;
   b) an optical coupler having first and second I/O ports and first and second loop ports, said first and second loop ports being connected to the first and second ends of said fiber to form said fiber into a loop, said coupler serving as means for:
      (i) dividing an input pulse entering one of said I/O ports into two component pulses which propagate in opposite directions around said loop, and
      (ii) receiving component pulses returning to said coupler after propagating around said loop and dividing the energy of the received component pulses between said first and second I/O ports in accordance with the relative phases of the received component pulses;
   c). wherein the length of said loop, the dispersions at the ends of said loop and the rate of change of dispersion along said loop are so related to one another that:
      (i) for input pulses having temporal widths greater than said predetermined temporal width, propagation around said loop causes the received component pulses to be generally in phase with one another, and
      (ii) for input pulses having temporal widths less than said predetermined temporal width, propagation around said loop causes the received component pulses to be generally out of phase with one another.

2. An optical fiber apparatus as set forth in claim 1 in which said coupler provides an approximately 50:50 coupling ratio.

3. An optical fiber apparatus as set forth in claim 1 in which the widths of pulses having temporal widths greater than said predetermined temporal width are large in relation to the length of said loop.

4. An optical fiber apparatus as set forth in claim 1 in which input pulses having temporal widths less than said predetermined temporal width have a reaction length which is relatively short in relation to the length of said loop, and in which input pulses having temporal widths greater than said predetermined temporal width have a reaction length which is relatively long in relation to the length of said loop.

5. An optical fiber apparatus as set forth in claim 1 in which, said coupler divides an input pulse having a temporal width less than said predetermined temporal width into a lower order component soliton and a higher order component soliton, said higher order component soliton having an amplitude which exceeds that of said lower order component soliton during a substantial part of the time that said solitons are propagating around said loop.

6. An optical fiber apparatus as set forth in claim 5 in which said coupler divides an input pulse having a temporal width greater than said predetermined temporal width into solitons of the same order.

7. An optical fiber apparatus as set forth in claim 5 in which the dispersion of said fiber decreases approximately continuously from said first end to said second end.

8. An optical fiber apparatus as set forth in claim 7 in which pulses having temporal widths greater than said predetermined temporal width respond substantially to the average dispersion value of said loop, while input pulses having temporal widths less than said predetermined width respond to the local dispersion values of said loop.

9. An optical fiber apparatus as set forth in claim 5 in which the dispersion of said fiber changes in a plurality of steps, each step comprising a fiber segment having a predetermined respective length and an approximately constant respective dispersion.

10. An optical fiber apparatus as set forth in claim 9 in which the lengths of said segments are small in relation to the local periods of said solitons.

11. An optical fiber apparatus as set forth in claim 9 in which the number of said segments is large in relation to the local periods of said solitons.

12. An optical fiber apparatus as set forth in claim 9 in which input pulses having temporal widths greater than said predetermined temporal width respond substantially to the average of the dispersion values of said steps, while input pulses having temporal widths less than said predetermined temporal width respond to the individual dispersion values of said steps.

13. An optical fiber apparatus as set forth in claim 9 in which the dispersion values of said steps decrease exponentially from said first end to said second end.

14. An optical fiber apparatus as set forth in claim 1 in which said fiber has a dispersion in the anomalous dispersion regime.

15. An optical fiber apparatus for reflecting optical pulses having temporal widths greater than a predetermined temporal width and transmitting optical pulses having widths less than said predetermined temporal width, comprising:

a) a dispersion decreasing optical fiber having a first, high dispersion end and a second, low dispersion end;

b) an optical coupler having first and second I/O ports and first and second loop ports, said first and second loop ports being connected to the first and second ends of said fiber, respectively, to form said fiber into a loop, said coupler serving to:
  (i) divide an input pulse applied to one of said I/O ports into two component pulses which counterpropagate around said loop; and
  (ii) receive component pulses which have propagated around said loop and divide the energy thereof between said I/O ports in accordance with the relative phases of the received pulses;

c) wherein component pulses derived from input pulses having temporal widths less than said predetermined temporal width are solitons of different orders which accumulate a substantial phase difference during their propagation around said loop, while component pulses derived from input pulses having temporal widths greater than said predetermined temporal width do not accumulate a substantial phase difference during their propagation around said loop.

16. An optical fiber apparatus as set forth in claim 15 in which said coupler provides a 50:50 coupling ratio.

17. An optical fiber apparatus as set forth in claim 15 in which input pulses having temporal widths less than said predetermined temporal width have a reaction length which is relatively small in relation to the length of said fiber, and in which input pulses having temporal widths greater than said predetermined temporal width have a reaction length which is relatively large in relation to the length of said fiber.

18. An optical fiber apparatus as set forth in claim 15 in which said solitons include a lower order soliton and a higher order soliton and in which said higher order soliton has an amplitude which exceeds that of said lower order soliton during a substantial part of the time that said solitons are propagating around said loop.

19. An optical fiber apparatus as set forth in claim 26 in which component pulses derived from an input pulse having a temporal width greater than said predetermined temporal width are solitons of the same order.

20. An optical fiber apparatus as set forth in claim 15 in which the dispersion of said fiber decreases approximately continuously from said first end to said second end.

21. An optical fiber apparatus as set forth in claim 20 in which said predetermined temporal width is selected so that input pulses having widths greater than said predetermined temporal width respond substantially to the average dispersion of said loop, while input pulses having temporal widths less than said predetermined temporal width respond to the local dispersion value of said fiber.

22. An optical fiber apparatus as set forth in claim 15 in which the dispersion of said optical fiber changes in a plurality of steps, each step comprising a fiber segment having a predetermined respective length and an approximately constant respective dispersion.

23. An optical fiber apparatus as set forth in claim 22 in which the lengths of said segments are small in relation to the soliton periods of said solitons.

24. An optical fiber apparatus as set forth in claim 22 in which the numbers of said segments is large in relation to the local periods of said solitons.

25. An optical fiber apparatus as set forth in claim 15 in which said predetermined temporal width is selected so that input pulses having temporal widths greater than said predetermined temporal width respond substantially to the average of the dispersion values of said steps, while input pulses having temporal widths less than said predetermined temporal width respond to the individual dispersion values of said steps.

26. An optical fiber apparatus as set forth in claim 15 in which the dispersion values of said steps decrease exponentially from said first end to said second end.

27. An optical fiber apparatus as set forth in claim 15 in which the dispersion in all parts of said loop is in the anomalous dispersion regime.

* * * * *

UNITED STATES PATENT AND TRADEMARK OFFICE
CERTIFICATE OF CORRECTION

PATENT NO. : 5,689,596
DATED : November 18, 1997
INVENTOR(S) : Alan F. Evans

It is certified that error appears in the above-indentified patent and that said Letters Patent is hereby corrected as shown below:

Title page, Related U.S. Application Data, (62), should read
-- Division of Ser. No. 577,135, filed Dec. 22, 1995. --

Signed and Sealed this

Twenty-third Day of June, 1998

Attest:

BRUCE LEHMAN

Attesting Officer

Commissioner of Patents and Trademarks